(12) United States Patent
Brenner et al.

(10) Patent No.: US 8,181,215 B2
(45) Date of Patent: May 15, 2012

(54) SYSTEM AND METHOD FOR PROVIDING VIDEO PROGRAM INFORMATION OR VIDEO PROGRAM CONTENT TO A USER

(75) Inventors: Scott Brenner, Superior, CO (US); Michael E. Cain, Arvada, CO (US); Kenneth L. Hamel, Louisville, CO (US); Joshua D. Staller, Littleton, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 2003 days.

(21) Appl. No.: 10/074,743

(22) Filed: Feb. 12, 2002

(65) Prior Publication Data

US 2003/0154479 A1 Aug. 14, 2003

(51) Int. Cl.
*H04N 7/173* (2011.01)
(52) U.S. Cl. .................. 725/116; 725/115; 709/219
(58) Field of Classification Search .............. 725/32, 725/40–43, 48–51, 54–55, 86–92, 100–103, 725/114–116, 135–136; 709/217–232
See application file for complete search history.

(56) References Cited

U.S. PATENT DOCUMENTS

| | | | | | |
|---|---|---|---|---|---|
| 3,886,302 | A | * | 5/1975 | Kosco ............................. | 380/211 |
| 5,583,937 | A | * | 12/1996 | Ullrich et al. ................... | 380/211 |
| 5,594,794 | A | * | 1/1997 | Eyer et al. ...................... | 380/231 |
| 5,875,303 | A | | 2/1999 | Huizer et al. | |
| 5,974,218 | A | * | 10/1999 | Nagasaka et al. .............. | 386/200 |
| 6,104,705 | A | | 8/2000 | Ismail et al. | |
| 6,173,112 | B1 | * | 1/2001 | Gruse et al. .................... | 386/291 |
| 6,175,386 | B1 | | 1/2001 | Van De Schaar-Mitrea | |
| 6,219,837 | B1 | * | 4/2001 | Yeo et al. ........................ | 725/38 |
| 6,636,271 | B1 | * | 10/2003 | Megeid .......................... | 348/559 |
| 6,711,741 | B2 | * | 3/2004 | Yeo ................................. | 725/87 |
| 6,829,781 | B1 | * | 12/2004 | Bhagavath et al. ............ | 725/94 |
| 6,832,386 | B1 | * | 12/2004 | Jerding et al. .................. | 725/39 |
| 6,868,551 | B1 | * | 3/2005 | Lawler et al. ................... | 725/40 |
| 7,127,735 | B1 | * | 10/2006 | Lee et al. ........................ | 725/87 |

(Continued)

FOREIGN PATENT DOCUMENTS

EP 0 757 487 A1 2/1997

(Continued)

OTHER PUBLICATIONS

Japanese Office Action for corresponding Japanese Patent Application No. 2003-568885, mailed Oct. 16, 2008, 5 pages.

(Continued)

*Primary Examiner* — Annan Shang
(74) *Attorney, Agent, or Firm* — Banner & Witcoff, Ltd.

(57) ABSTRACT

In a system for broadcasting video programs to a user including a display, a system and method for providing program information or a copy of at least a portion of a program to the user. In one embodiment, a controller receives an input signal representing a request for summary information concerning a program, the program having a beginning and the input signal generated at a time during the broadcast. The controller provides via the display a summary of the program from the program beginning to the input signal time in response to the input signal. A controller may alternatively monitor a period of time during which the display is tuned to a broadcast of a program, the period starting during the broadcast. The controller is used to provide via the display a copy of at least a portion of the program when the period exceeds a predetermined threshold time.

20 Claims, 2 Drawing Sheets

U.S. PATENT DOCUMENTS

| | | | |
|---|---|---|---|
| 2002/0170068 A1* | 11/2002 | Rafey et al. | 725/112 |
| 2003/0037068 A1* | 2/2003 | Thomas et al. | 707/200 |
| 2003/0161611 A1* | 8/2003 | Okada | 386/69 |
| 2008/0072260 A1* | 3/2008 | Rosin et al. | 725/56 |

FOREIGN PATENT DOCUMENTS

| | | |
|---|---|---|
| JP | 11177962 | 7/1999 |
| JP | 11177962 A | 7/1999 |
| JP | 2000339857 | 12/2000 |
| JP | 2000339857 A | 12/2000 |
| JP | 2001156664 | 6/2001 |
| JP | 2001156664 A | 6/2001 |
| WO | 0176249 | 10/2001 |

OTHER PUBLICATIONS

Canadian Application No. 2,472,921 Office Action dated Nov. 25, 2009.

Japan Patent Application No. 2009-042774 Office Action dated Sep. 6, 2010.

* cited by examiner

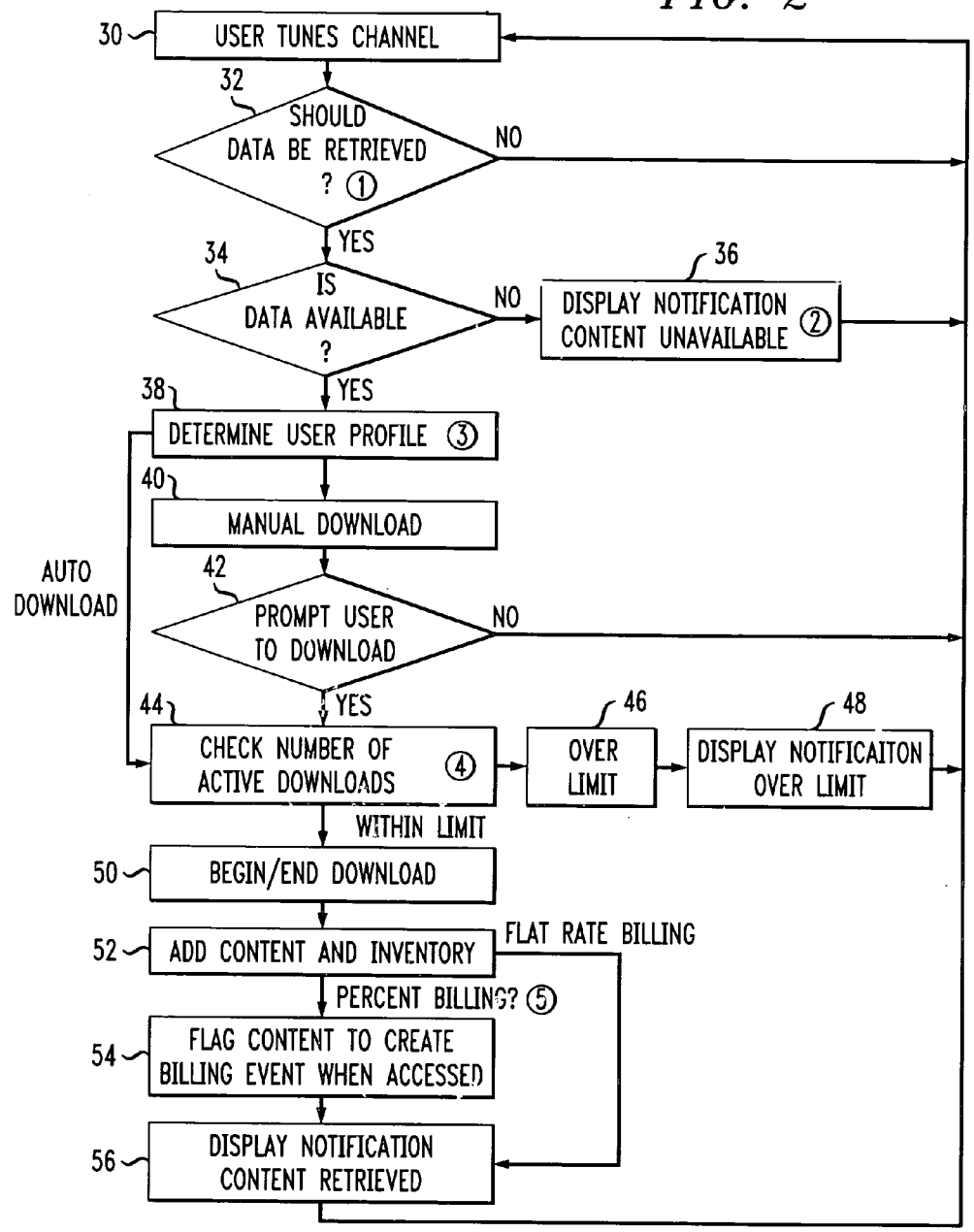

FIG. 2

① SYSTEM DETERMINES WHETHER OR NOT TO DOWNLOAD DATA BASED ON HOW LONG THEY PAUSE ON A CHANNEL
② NOTIFICATION MIGHT BE VIA TRANSLUCENT TEST OR VIA GRAPHICAL ICON
③ USERS MIGHT ELECT TO AUTOMATICALLY RETRIEVE CONTENT OF INTEREST OR TO BE MANUALLY PROMPTED BEFORE DOWNLOADING
④ THE SYSTEM WILL ONLY SUPPORT A PRE-DETERMINED NUMBER OF SYSTEMS TO EACH USER
⑤ WITH PERCENT BILLING, CUSTOMERS RECEIVE A CHARGE EACH TIME THEY VIEW DOWNLOADED CONTENT. FLAT RATE CUSTOMERS CAN DOWNLOAD FOR A FIXED MONTHLY FEE

SYSTEM AND METHOD FOR PROVIDING VIDEO PROGRAM INFORMATION OR VIDEO PROGRAM CONTENT TO A USER

BACKGROUND OF THE INVENTION

1. Field of the Invention

The present invention relates to a system and method for providing video program information or video program content to a user.

2. Background

Cable and satellite television service providers now offer subscribers hundreds of channels, each broadcasting a wide variety of video programs, thereby presenting subscribers with hundreds of programming choices at any given time of day. As a result, a subscriber is often forced to switch between television programs of interest, or to finish watching one program before the subscriber can begin watching another program, the broadcast of which has already started.

Moreover, the onset of television viewing by a subscriber is often asynchronous with respect to program broadcast schedules. Still further, television programs may not fit into standard one-half or one hour time slots, or the time then available to a subscriber for viewing. Thus, inevitably, some program of interest to a subscriber will be in-progress, no matter when the subscriber chooses to begin watching television.

For all of these reasons, subscribers to cable and/or satellite television services are often faced with decisions as to whether to begin watching a program that is already in progress. That is, for an in-progress program, no mechanism or procedure exists for a subscriber to "catch-up" on that portion of the program already broadcast. Similarly, for an in-progress program, no mechanism or procedure exists for a subscriber to obtain a copy of that portion of the program already broadcast, or a complete copy of the program, either automatically or upon a request by the subscriber.

In that regard, on-screen television program guides are known which afford the display of television program information, which may include program start and end times, as well as a brief, and often cryptic, description of the program. However, such program guides neither deliver nor support the delivery of "catch-up" information tailored for an individual viewer and a given program based on the time that the viewer begins watching the program.

Still further, in addition to well known video cassette recording (VCR) systems, which can be programmed in advance of the broadcast time of a television program to automatically record the program at the broadcast time, digital video recording (DVR) systems are known that can also record television programs, either as scheduled events or on a speculative basis based on pre-determined user preferences provided to the DVR system by the user. In that regard, current DVR systems also allow a user to go back to any point in the locally stored video content, up to the existing storage capacity of the DVR system.

Such existing VCR and DVR systems, however, do not allow a user to obtain that portion of an in-progress program already broadcast (including from the beginning of the program), or a complete copy of the in-progress program if the user was not previously tuned to the particular channel on which the program is broadcast. In addition, although streaming video methods exist that allow a user to download digital video, such methods do not work seamlessly and/or dynamically with passive television viewing. That is, such methods again do not allow a user to automatically obtain that portion of an in-progress television program already broadcast (including from the beginning of the program), or a complete copy of the in-progress program.

Thus, there exists a need for a system and method that would, in a system for broadcasting video programs, allow a user to "catch-up" on a program already in progress. Such a system and method would allow a user, such as a cable or satellite service subscriber, to initiate a request for and receive a timely synopsis or summary of major events, actions, outcomes, or other information pertaining to a program, the broadcast of which is already in progress.

In addition, there exists a need for a system and method that would allow such a user, either automatically or upon request, to obtain a copy of at least a portion of a program, the broadcast of which is already in progress. Such a system and method would allow a user to dynamically retrieve, store and manage the video content of such programs. Such systems and methods would thereby enhance the value of video programming by making such programming more comprehensible, interesting, and entertaining to viewers. In such a fashion, such systems and methods would increase the likelihood that such programming will be watched by more viewers, which is an important goal of program content providers, cable and/or satellite television service providers, and advertisers.

SUMMARY OF THE INVENTION

Accordingly, the present invention provides, in a system for broadcasting video programs to a user including a display, a system and method for providing program information or a copy of at least a portion of a program to the user.

According to the present invention, then, in a system for broadcasting video programs to a user including a display, a system is provided for providing program information to the user. The system comprises an input device for use in generating an input signal representing a request for summary information concerning a video program, the program having a beginning and the input signal being generated at a time during a broadcast of the program. The system further comprises a controller for receiving the input signal and, in response thereto, providing via the display a summary of the program from the program beginning to the input signal time.

Also according to the present invention, in a system for broadcasting video programs to a user including a display, a method is provided for providing program information to the user. The method comprises providing a controller for receiving an input signal representing a request for summary information concerning a video program, the program having a beginning and the input signal being generated at a time during a broadcast of the program, and for providing via the display a summary of the program from the program beginning to the input signal time in response to receipt of the input signal.

Still further according to the present invention, in a system for broadcasting video programs to a user including a display, a system is provided for providing a copy of at least a portion of the program to the user. The system comprises a controller for monitoring a period of time during which the display is tuned to a broadcast of a video program, the period starting during the broadcast of the program, and for use in providing via the display a copy of at least a portion of the program when the period exceeds a predetermined threshold time. The system further comprises a storage medium for use in storing the copy of at least a portion of the program.

Further still according to the present invention, in a system for broadcasting video programs to a user including a display, a method is provided for providing a copy of at least a portion of the program to the user. The method comprises providing a controller for monitoring a period of time during which the display is tuned to a broadcast of a video program, the period starting during the broadcast of the program, and for use in providing via the display a copy of at least a portion of the program when the period exceeds a predetermined threshold time.

The preferred embodiments of the present invention are set forth in the following detailed descriptions thereof, including the accompanying drawings.

BRIEF DESCRIPTION OF THE DRAWINGS

FIG. 2 is a simplified, exemplary flowchart concerning the present invention;

DETAILED DESCRIPTION OF THE PREFERRED EMBODIMENT(S)

Figure 1:
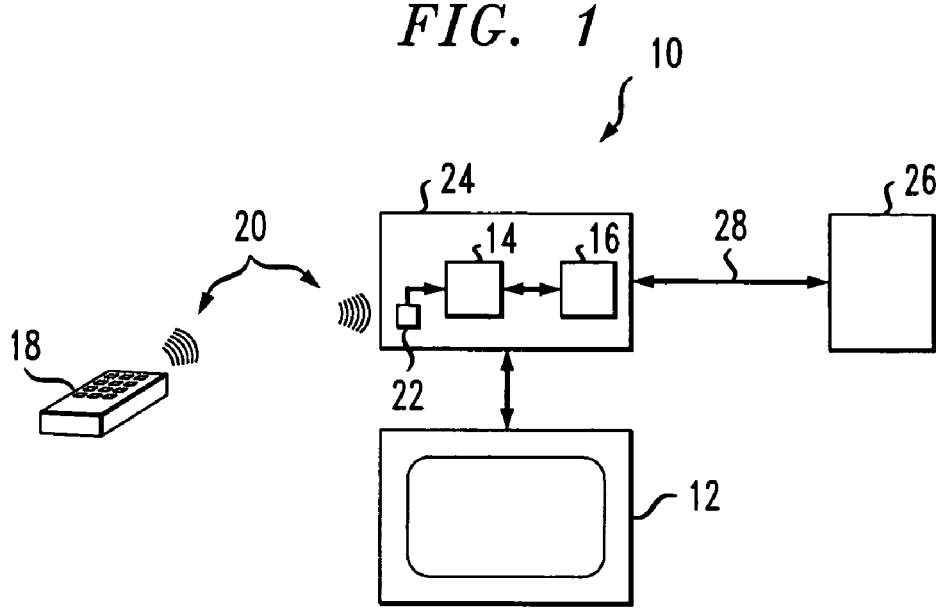
FIG. 1 is a simplified, exemplary block diagram of the system of the present invention.

Referring now to the Figures, the preferred embodiments of the present invention will now be described in detail. As previously noted, cable and satellite television service providers now offer subscribers hundreds of channels, each broadcasting a wide variety of video programs. As a result, a subscriber is often forced to switch between television programs of interest, or to finish watching one program before the subscriber can begin watching another program, the broadcast of which has already started.

Moreover, the onset of television viewing by a subscriber is often asynchronous with respect to program broadcast schedules. Still further, television programs may not fit into standard one-half or one hour time slots, or the time then available to a subscriber for viewing. For all of these reasons, subscribers to cable and/or satellite television services are often faced with decisions as to whether to begin watching a program that is already in progress. That is, for an in-progress program, no mechanism or procedure exists for a subscriber to "catch-up" on that portion of the program already broadcast. Similarly, for an in-progress program, no mechanism or procedure exists for a subscriber to obtain a copy of that portion of the program already broadcast, or a complete copy of the program, either automatically or upon a request by the subscriber.

In that regard, as also described previously, on-screen television program guides are known which afford the display of television program information, which may include program start and end times, as well as a brief, and often cryptic, description of the program. However, such program guides neither deliver nor support the delivery of "catch-up" information tailored for an individual viewer and a given program based on the time that the viewer begins watching the program.

Still further, in addition to well known video cassette recording (VCR) systems, which can be programmed in advance of the broadcast time of a television program to automatically record the program at the broadcast time, digital video recording (DVR) systems are known that can also record television programs, either as scheduled events or on a speculative basis based on pre-determined user preferences provided to the DVR system by the user. In that regard, current DVR systems also allow a user to go back to any point in the locally stored video content, up to the existing storage capacity of the DVR system.

Such existing VCR and DVR systems, however, do not allow a user to obtain that portion of an in-progress program already broadcast (including from the beginning of the program), or a complete copy of the in-progress program if the user was not previously tuned to the particular channel on which the program is broadcast. In addition, although streaming video methods exist that allow a user to download digital video, such methods do not work seamlessly and/or dynamically with passive television viewing. That is, such methods again do not allow a user to automatically obtain that portion of an in-progress television program already broadcast (including from the beginning of the program), or a complete copy of the in-progress program.

Thus, there exists a need for a system and method that would, in a system for broadcasting video programs, allow a user to "catch-up" on a program already in progress. Such system and method would allow a user, such as a cable or satellite service subscriber, to initiate a request for and receive a timely synopsis or summary of major events, actions, outcomes, or other information pertaining to a program, the broadcast of which is already in progress.

In addition, there exists a need for a system and method that would allow such a user, either automatically or upon request, to obtain a copy of at least a portion of a program, the broadcast of which is already in progress. Such a system and method would allow a user to dynamically retrieve, store and manage the video content of such programs. Such systems and methods would enhance the value of video programming by making such programming more comprehensible, interesting, and entertaining to viewers, thereby increasing the likelihood that such programming will be watched by more viewers, which is an important goal of program content providers, cable and/or satellite television service providers, and advertisers.

In one embodiment, the present invention enables a television viewer to "catch-up" on a program, the broadcast of which is already in progress. Using standard television input devices and methods, such as a wireless television remote control, a wireless keyboard, an onscreen guide, or any combination thereof, a viewer initiates a request for a timely synopsis or summary of major events, actions, outcomes and/or other information pertaining to that portion of the in-progress program already broadcast.

Such summary information may take any of a number of forms. For example, such summary information may be video content comprising text, which is simple and easily manipulated. Alternatively, IP streaming media, which may comprise audio and/or video content, such as video clips, may be provided using the full display, an overlay, a separate channel, or a separate window on the television display, such as via picture-in-picture functionality. "Catch-up" information is preferably provided by the content providers of the television programs.

More particularly, an exemplary sequence of events to deliver a web-based text synopsis includes a viewer selecting a "catch-up" capability via a television wireless remote control, wireless keyboard and/or an onscreen guide. A television set-top box then requests a URL for dynamically generated video content comprising text. A server for the program content provider receives the request and delivers one of several possible summaries based on a clock time indicative of that portion of the in-progress program already broadcast. Thereafter, the set-top box delivers the summary to the viewer via the television display. Another possible alternative is the use of Advanced Television Enhancement Form (ATVEF) transport B to send text summaries embedded in the video stream of the program. In this embodiment, the set-top box stores the most current summary, and delivers that summary to the viewer via the display at the viewer's request.

Referring now to FIG. 1, a simplified, exemplary block diagram including the system of the present invention is shown, denoted generally by reference numeral 10. As seen therein, a display (12) is provided in communication with a controller (14). Display (12) is preferably a television for use by a cable or satellite television service subscriber (not shown), although the present invention is suitable for use with other types of display devices, such as a computer. Controller (14) is itself provided in communication with a storage medium (16). In that regard, storage medium (16) is preferably RAM, although any other type of storage medium, such as a magnetic disk, could also be used.

A cable or satellite television service subscriber (who may also be referred to as a user or viewer) interfaces with controller (14) via an input device (18). In that regard, while input device (18) preferably comprises a wireless remote control device, any type of input device known to those of ordinary skill in the art could also be used, such as a wireless keyboard. Input device (18) is for use by a viewer (not shown) to generate input signals (20) for use in controlling display (12) or for use in the present invention. As seen in FIG. 1, controller (14) receives input signal (20) from input device (18) via a conventional receiver (22) configured for use with input device (18). Controller (14), storage medium (16) and receiver (22) preferably form at least part of a television set-top box (24).

As part of set-top box (24), controller (14) is provided in communication with at least one remote site (26) via at least one communication path (28). In that regard, the remote site or sites (28) may be associated with a cable or satellite television service provider and/or a program content provider, and may include a server, data storage devices and/or other equipment. In that same regard, the communication path or paths (28) preferably provide for two-way communication between set-top box (24) and remote site (26), and may comprise any type of path suitable for such communication, such as a cable line, DSL, telephone line, satellite link, wireless link, or any other well known communication path. Still further, communication path or paths (28) may also comprise any hardware or devices necessary for providing such communication, such as a modem or a satellite dish receiver.

As can be seen from FIG. 1, display (12), input device (18), set-top box (24), remote site (26), and communication path (28) are part of a system for broadcasting video programs, such as for viewing by a satellite or cable television subscriber. Thus, in a system for broadcasting video programs to a user including a display (12), the present invention provides a system for providing program information to the user. In that regard, input device (18) is for use in generating an input signal (20) representing a request for summary information concerning a video program, the program having a beginning and the input signal being generated at a time during a broadcast of the program. Controller (14) is for receiving the input signal (20) and, in response thereto, providing via the display (12) a summary of the program from the program beginning to the input signal time.

In that regard, controller (14) is preferably further for transmitting a control signal to remote site (26) in response to receipt of the input signal (20), and for receiving the summary in response to transmission of the control signal. Controller (14) may be operative to receive the summary from the remote site (26), or from a site other than the remote site (26).

As previously described, the summary may comprises video content, audio content, or both. In that regard, the video content may comprise text, and such text may be embedded in the program, to be provided by the controller (14) via the display (12) only after receipt of the input signal (20) by the controller (14). Further, the video content may be provided on a portion of the display (12) separate from a portion of the display (12) used to provide the program.

In another embodiment, the present invention provides a system and method for requesting and storing the un-viewed portion of a video broadcast already in progress. This embodiment preferably involves the use of a set-top box (24) with Digital Video Recording (DVR) functionality, a head-end architecture that supports server based storage of the broadcast video content, and a two-way broadband data network. According to this embodiment of the present invention, a viewer is able to initiate network retrieval of a previously broadcast video program based on the viewer's activity as the viewer alternates between programs on different channels (i.e., channel "surfs").

For example, referring still to FIG. 1, after channel surfing among a variety of channels, a viewer tunes display (12) to a particular television program which is in progress, and then watches the program for a pre-determined period of time. The set-top-box (24) then automatically contacts a video storage device at the head-end, such as may be provided at remote site (26), that has been storing the broadcast video, and begins to download the program from the beginning using the Data-Over-Cable Service Interface Specification (DOCSIS) channel, or any other out-of-band (OOB) data channel, such as may be provided by communication path (28).

In addition to requesting and storing the previously broadcast video using an OOB channel, the set-top-box (24) also preferably stores the broadcast video from the moment the user first tuned display (12) to the program, and continues to store the content as it is broadcast in real time. The OOB download preferably occurs at the maximum download speed available on the network, with the download starting at the beginning of the program, continuing until the initial storage of the program and, if content is available on the server, continuing to download the program from the end of the program.

According to this embodiment of the present invention, the user's channel tune event automatically initiates the local storage of the program content. In that regard, for example, local storage may be delayed for a predetermined amount of time to ensure that the viewer is actually tuned to and watching a particular program, rather than channel surfing. The present invention further provides for managing the download process as a user watches a program or moves through the locally stored content. In that regard, for example, if a user elects to move quickly to the beginning of locally stored content, the content already viewed is preferably kept, the content currently being watched is preferably cached locally, such as in storage medium (16), and those portions of content not yet cached may be requested in a specific order. Still further, the present invention also provides for network content requests, storage management and storage clean-up as the user changes channels. In that regard, for example, the user is preferably prompted by set-top-box (14) via display (12) as to whether or not to continue downloading program content if the user changes channels during the download process.

In such fashion, the present invention allows a user to watch an entire program that the user previously would have missed by tuning in to the program after its broadcast has already started. As a result, a user will have access to the beginning of a program, or the entire program, by the mere act of tuning in and watching a portion of the program.

According to this embodiment, and referring still to FIG. 1, in a system for broadcasting video programs to a user including a display (12), the present invention provides a system for providing a copy of at least a portion of the program to the user. Controller (14) is for monitoring a period of time during which the display (12) is tuned to a broadcast of a video program, the period starting during the broadcast of the program, and for use in providing via the display (12) a copy of at least a portion of the program when the period exceeds a predetermined threshold time. Storage medium (16) is for use in storing the copy of at least a portion of the program.

In this embodiment, controller (14) is preferably further for communicating with remote site (26) to request a copy of at least a portion of the program when the period exceeds the predetermined threshold time, and for receiving the copy of at least a portion of the program. In that regard, controller (14) may be operative to receive the copy of at least the portion of the program from remote site (26), or from a site other than remote site (26). As previously described, the copy of at least a portion of the program preferably comprises a complete copy of the program.

Also in this embodiment, input device (18) may be provided for use in generating a request for display of, and the controller (14) is further for providing via the display (12), at least a portion of the copy of at least a portion of the program during the broadcast of the program. Still further, as also described previously, controller (14) may also be for requesting, and input device (18) for use in generating, an indication whether to continue receiving the copy of at least a portion of the program when the display (12) is tuned to a broadcast of another video program before receipt of the copy of at least a portion of the program has been completed.

Alternatively in this embodiment, controller (14) may be provided for requesting, and input device (18) may be for use in generating, an indication whether a copy of at least a portion of the program is desired when the period exceeds a predetermined threshold time. In that regard, controller (14) may be provided for communicating with remote site (26) to request a copy of at least a portion of the program upon a receipt of an indication that a copy of at least a portion of the program is desired.

Referring next to FIG. 2, a simplified, exemplary flowchart concerning this embodiment of the present invention is shown. As seen therein, after a user tunes to a particular channel at (30), the present invention then determines at (32) whether or not to download data based on how long the user pauses on that channel. If it is determined at (32) that the user did not pause for a sufficient time on that channel, the present invention again determines at (32) whether or not to download data based on how long the user pauses on a subsequent channel.

If it is determined at (32) that data is to be downloaded, it is then determined at (34) if the data is available. If not, the user is notified at (36), such as via translucent text or a graphical icon on the display, that the desired content is unavailable. If the data is available, a user profile is determined at (38). In that regard, a user might have previously elected to automatically retrieve content of interest or, alternatively, to be manually prompted before downloading.

If the user profile indicates manual download is desired at (40), then the present invention prompts the user as to whether a download is desired at (42). If not, no further action is undertaken. Alternatively, if the user indicates that a download is desired, or if the user profile indicates automatic download is desired, the number of active downloads by the user is checked at (44). In that regard, the present invention preferably supports only a pre-determined number of data streams to each user. If the user is over such a pre-determined limit at (46), the user is notified at (48), again such as via translucent text or a graphical icon on the display, that such a pre-determined limit has been exceeded.

Figure 3:
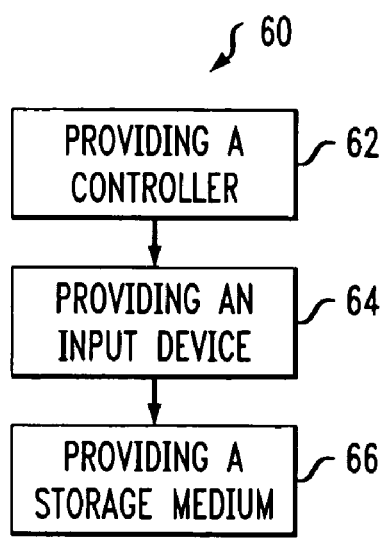
FIG. 3 is a simplified, exemplary flowchart of one embodiment of the method of the present invention.

Alternatively, if the user is within such a pre-determined limit, the download process is undertaken at (50), and the content is added to the user's inventory at (52). As seen in FIG. 3, a user may be charged for such a service, and billing for such a charge may be on a flat rate or per event basis. With a flat rate charge, a user may download for a fixed monthly, or other periodic, fee. With a per event charge, a user receives a charge each time downloaded content is viewed. For a per event charge, downloaded content is flagged to create a billing event at (54) when the downloaded content is viewed. For either type of billing basis, the user is notified at (56), again such as via translucent text or a graphical icon on the display, that the downloaded content has been retrieved and is available for viewing.

Referring next to FIG. 3, a simplified, exemplary flowchart of one embodiment of the method of the present invention is shown, denoted generally by reference numeral 60. The method (60) is for use in a system for broadcasting video programs to a user including a display, and is for providing program information to the user. As seen in FIG. 3, the method (60) comprises providing (62) a controller for receiving an input signal representing a request for summary information concerning a video program, the program having a beginning and the input signal being generated at a time during a broadcast of the program, and for providing via the display a summary of the program from the program beginning to the input signal time in response to receipt of the input signal. The method (60) may further comprise providing (64) an input device for use in generating the input signal.

As previously described, the controller may further be for transmitting a control signal to a remote site in response to receipt of the input signal, and for receiving the summary in response to transmission of the control signal. In that regard, the controller may be operative to receive the summary from the remote site, or from another site. As also previously described, the summary may comprise video content, audio content, or both. In that regard, the video content may comprise text, and may be provided on a portion of the display separate from a portion of the display used to provide the program. Still further, the summary may comprise text embedded in the program, the text to be provided by the controller via the display only after receipt of the input signal by the controller. The method (60) may also further comprise providing (66) a storage medium for use in storing the summary.

Figure 4:
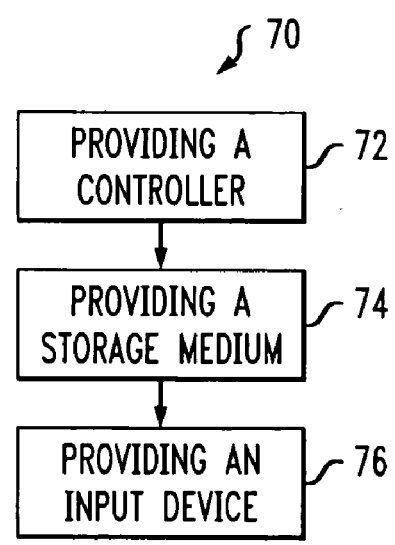
FIG. 4 is a simplified, exemplary flowchart of another embodiment of the method of the present invention.

Referring now to FIG. 4 a simplified, exemplary flowchart of another embodiment of the method of the present invention is shown, denoted generally by reference numeral 70. The method (70) is for use in a system for broadcasting video programs to a user including a display, and is for providing a copy of at least a portion of the program to the user. As seen in FIG. 3, the method (70) comprises providing (72) a controller for monitoring a period of time during which the display is tuned to a broadcast of a video program, the period starting during the broadcast of the program, and for use in providing via the display a copy of at least a portion of the program when the period exceeds a predetermined threshold time. The method (70) may further comprise providing (74) a storage medium for use in storing the copy of at least a portion of the program.

As previously described, the controller may further be for communicating with a remote site to request a copy of at least a portion of the program when the period exceeds the predetermined threshold time, and for receiving the copy of at least a portion of the program. In that regard, the controller may be operative to receive the copy of at least the portion of the program from the remote site, or from some other site. As also previously described, the copy of at least a portion of the program may comprise a complete copy of the program.

Referring still to FIG. 4, the method (70) may further comprise providing (76) an input device, wherein the input device is for use in generating a request for display of, and the controller is further for providing via the display, at least a portion of the copy of at least a portion of the program during the broadcast of the program. The controller may further be for requesting, and the input device may be for use in generating, an indication whether to continue receiving the copy of at least a portion of the program when the display is tuned to a broadcast of another video program before receipt of the copy of at least a portion of the program has been completed.

The method (70) may also further comprise providing (76) an input device, wherein the controller is further for requesting, and the input device is for use in generating, an indication whether a copy of at least a portion of the program is desired when the period exceeds a predetermined threshold time, and the controller is further for communicating with a remote site to request a copy of at least a portion of the program upon a receipt of an indication that a copy of at least a portion of the program is desired. In that regard, as previously described, the controller may be operative to receive the copy of at least the portion of the program from the remote site, or from another site. As also previously described, the copy of at least a portion of the program may comprise a complete copy of the program.

As described previously, the input device may further be for use in generating a request for display of, and the controller may further be for providing via the display, at least a portion of the copy of at least a portion of the program during the broadcast of the program. As also described previously, the controller may further be for requesting, and the input device may further be for use in generating, an indication whether to continue receiving the copy of at least a portion of the program when the display is tuned to a broadcast of another video program before receipt of the copy of at least a portion of the program has been completed.

It should be noted that the simplified flowcharts depicted in FIGS. 3 and 4 are exemplary of the method of the present invention. In that regard, the steps of such method may be executed in sequences other than those shown in FIGS. 3 and 4, including the execution of one or more steps simultaneously.

As is readily apparent from the foregoing description, the present invention provides, in a system for broadcasting video programs to a user including a display, a system and method for providing program information or a copy of at least a portion of a program to the user. The present invention provides a system and method that allow a user to "catch-up" on a program already in progress. The present invention allows a user, such as a cable or satellite service subscriber, to initiate a request for and receive a timely synopsis or summary of major events, actions, outcomes, or other information pertaining to a program, the broadcast of which is already in progress.

In addition, the present invention allows such a user, either automatically or upon request, to obtain a copy of at least a portion of a program, the broadcast of which is already in progress. The present invention allows a user to dynamically retrieve, store and manage the video content of such programs. The present invention thereby enhances the value of video programming by making such programming more comprehensible, interesting, and entertaining to viewers, thereby increasing the likelihood that such programming will be watched by more viewers, which is an important goal of program content providers, cable and/or satellite television service providers, and advertisers.

While the preferred embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
receiving, at a terminal, a request to present a program being transmitted by a provider, wherein the request is received after a start time of program transmission;
monitoring, by the terminal, a length of time during which a user device has been presenting the program;
determining, by the terminal, that the length of time exceeds a predetermined threshold amount of time;
generating and communicating a request to the provider to retrieve a copy of a portion of the program subsequent to the request to present the program and said determining; and
receiving the copy of the portion of the program, wherein the portion comprises the program transmitted between the start time and a receipt time of the request to present the program.

2. The method of claim 1, further comprising generating a prompt requesting approval prior to generating the request to retrieve the copy.

3. The method of claim 1, further comprising causing the user device to present the copy of the portion of the program.

4. The method of claim 1, wherein the copy does not include the portion of the program transmitted after the receipt time.

5. The method of claim 1, further comprising:
receiving a channel selection during transmission of the program;
receiving a request for a synopsis of the program during transmission of the program;
upon receipt of the request for the synopsis, identifying a portion of the program that has been transmitted as of an identified clock time; and
causing presentation of the synopsis of the program that summarizes the portion of the program that has been transmitted from a beginning of program transmission until the identified clock time.

6. The method of claim 5, wherein the synopsis is presented in a fast forward mode.

7. The method of claim 5, further comprising determining that the user device has maintained the channel selection for a predefined period of time before causing presentation of the synopsis.

8. An apparatus comprising:
a storage medium; and
a controller operatively coupled to the storage medium, the controller being configured to cause the apparatus to perform operations comprising:
receiving a request to present a program being transmitted by a provider, wherein the request is received after a start time of program transmission;
monitoring a length of time during which a user device has been presenting the program;
determining that the length of time exceeds a predetermined threshold amount of time;

retrieving a copy of a portion of the program subsequent to said request and said determining; and causing presentation of the copy of the portion of the program, wherein the portion comprises the program transmitted between the start time and a receipt time of the request to present the program.

9. The apparatus of claim 8, wherein the controller is configured to cause the apparatus to generate a prompt requesting approval prior to retrieving the copy.

10. The apparatus of claim 8, wherein the controller is configured to cause the apparatus to automatically generate and communicate a request to retrieve the copy.

11. The apparatus of claim 8, wherein the copy does not include the portion of the program broadcasted after the receipt time.

12. The apparatus of claim 8, wherein the controller is configured to cause the apparatus to perform:

receiving a channel selection during transmission of the program;

receiving a request for a synopsis of the program during transmission of the program;

upon receipt of the request for the synopsis, identifying a portion of the program that has been transmitted as of an identified clock time; and causing presentation of the synopsis that summarizes the portion of the program that has been transmitted from a beginning of program transmission until the identified clock time.

13. The apparatus of claim 12, wherein the synopsis is presented in a fast forward mode.

14. The apparatus of claim 12, wherein the controller is configured to determine that the channel selection has been maintained for a predefined period of time before causing presentation of the synopsis.

15. A method comprising:

causing, by a server, transmission of a program to a terminal;

receiving a request from the terminal that requests a copy of a portion of the program; and causing, in response to a determination that a user device has been presenting the program for a length of time in excess of a predetermined threshold amount of time, transmission of the copy of the portion of the program to the terminal, wherein the portion of the program comprises the program transmitted between a start time of the program and a second time corresponding to when the user device first presented the program.

16. The method of claim 15, wherein the copy of the portion of the program comprises a complete copy of the program.

17. The method of claim 15, wherein the copy of the portion of the program comprises less than a complete copy of the program.

18. A system comprising:

a data storage device; and a server operatively coupled to the data storage device, the server being configured to cause the system to perform operations comprising:

causing transmission of a program to a terminal;

receiving a request from the terminal that requests a copy of a portion of the program; and causing, in response to a determination that a user device has been presenting the program for a length of time in excess of a predetermined threshold amount of time, transmission of the copy of the portion of the program to the terminal, wherein the portion of the program comprises the program transmitted between a start time of the program and a second time corresponding to when the user device first presented the program.

19. The system of claim 18, wherein the copy of the portion of the program comprises a complete copy of the program.

20. The system of claim 18, wherein the copy of the portion of the program comprises less than a complete copy of the program.

* * * * *